United States Patent [19]
Kashihara

[11] Patent Number: 5,047,935
[45] Date of Patent: Sep. 10, 1991

[54] AUTOMATIC TRANSMISSION CONTROL APPARATUS, HAVING MEANS FOR DETERMINING THE COMPLETION OF A SHIFT

[75] Inventor: Yuji Kashihara, Toyota, Japan

[73] Assignee: Toyota Jishoda Kabushiki Kaisha, Japan

[21] Appl. No.: 404,753

[22] Filed: Sep. 8, 1989

[30] Foreign Application Priority Data

Sep. 22, 1988 [JP] Japan ................................. 63-238439

[51] Int. Cl.⁵ ...................... B60K 41/10; B60K 41/18; G06F 15/20
[52] U.S. Cl. .................................... 364/424.1; 74/866
[58] Field of Search ............... 364/424.1; 74/866, 867, 74/868

[56] References Cited

U.S. PATENT DOCUMENTS

| | | | |
|---|---|---|---|
| 4,688,450 | 8/1987 | Hayashi et al. | 364/424.1 |
| 4,690,017 | 9/1987 | Taniguchi et al. | 364/424.1 |
| 4,727,772 | 3/1988 | Sumiya et al. | 74/867 |
| 4,727,773 | 3/1988 | Sumiya et al. | 74/867 |
| 4,781,080 | 11/1988 | Iwatsuki | 364/424.1 |
| 4,783,743 | 11/1988 | Yashiki et al. | 364/424.1 |
| 4,967,355 | 10/1990 | Iwatsuki et al. | 364/424.1 |

FOREIGN PATENT DOCUMENTS 48-20348 6/1973 Japan .
61-149657 7/1986 Japan .

OTHER PUBLICATIONS

SAE Technical Paper Series No. 840448, Electronic Control of a 4-Speed Automatic Transmission with Lock-Up Clutch, Manfred Schwab et al, Feb. 27-Mar. 2, 1984.

Primary Examiner—Felix D. Gruber
Attorney, Agent, or Firm—Oblon, Spivak, McClelland, Maier & Neustadt

[57] ABSTRACT

An apparatus for controlling an automatic transmission of a motor vehicle, which has a first and a second transmission mechanism, and a testing device for testing for a shifting operation which requires shifting actions of both of the first and second transmission mechanisms. The apparatus further has a determining device for determining, based on a rotary member of the second transmission mechanism, that the shifting action of the second shifting mechanism is completed. The determining device determines that the shifting operation of the transmission is completed, at the time when a predetermined time interval has passed after the detemination that the shifting action of the second shifting mechanism is comleted. The point of time at which the completion of the shifting operation is determined may be utilized for various purposes for controlling the transmission.

7 Claims, 6 Drawing Sheets

| SHIFT LEVER POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | ○ | | | | ◎ | | ◎ |
| D | 3 | ○ | ○ | ○ | ○ | | | | | | ◎ |
| D | 4 | ○ | ○ | | ○ | | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | ○ | | | | | | ◎ |
| L | 1 | ○ | | ○ | | | ○ | | | ◎ | ◎ |
| L | 2 | ○ | | ○ | ○ | ○ | | | ◎ | | ◎ |

◎ : ACTIVATED ONLY WHILE ENGINE TORQUE IS TRANSMITTED IN FORWARD DIRECTION

FIG.2

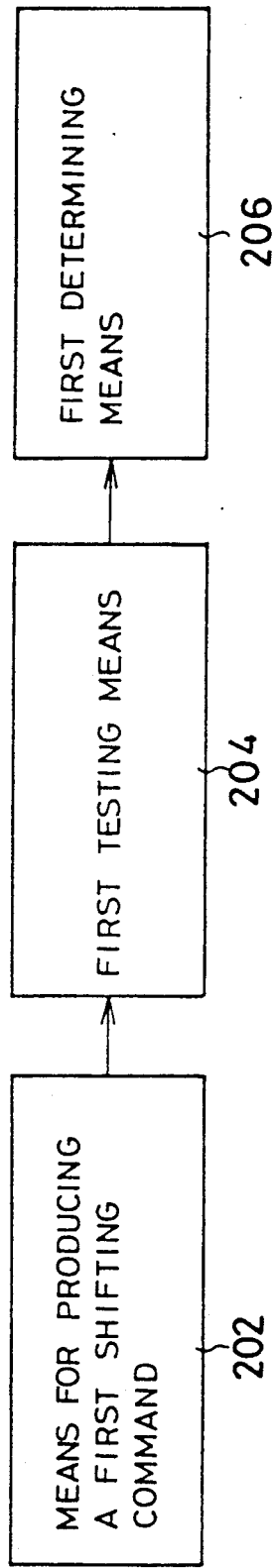
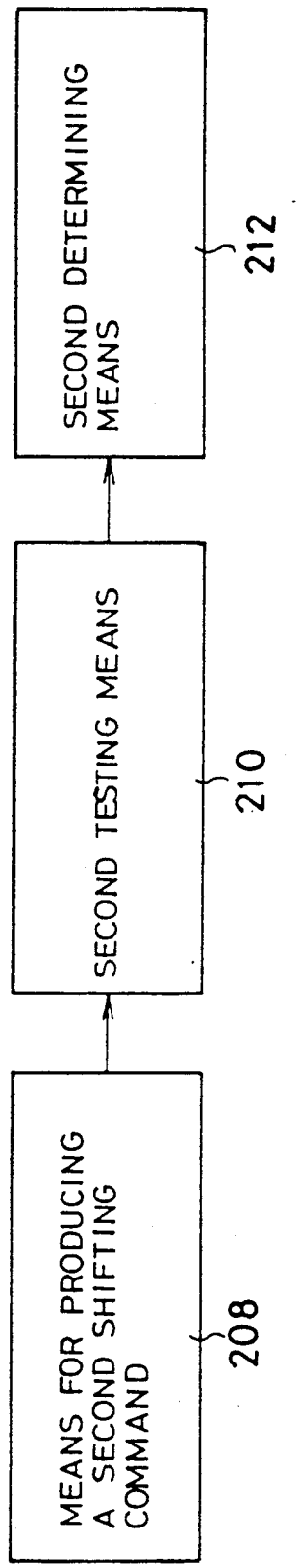

AUTOMATIC TRANSMISSION CONTROL APPARATUS, HAVING MEANS FOR DETERMINING THE COMPLETION OF A SHIFT

BACKGROUND OF THE INVENTION

1. Field of the Invention

The present invention relates in general to an apparatus for controlling an automatic transmission disposed in a power transmitting system of a motor vehicle, and more particularly to a device for determining the completion of a shifting operation of the transmission.

2. Discussion of the Prior Art

Keeping pace with a growing tendency toward increased complexity and sophistication in controlling an automatic transmission of a motor vehicle, a controller for controlling the automatic transmission is required to accurately determine the moments at which shifting operations of the transmission are completed. The determined moment of completion of a shifting operation of the transmission is utilized to control the transmission with a reduced degree of shifting shocks. For example, the moment of completion of an engaging action of the transmission is used to hold a lockup clutch of the transmission in its released position, or to effect a feedback control of a fluid pressure applied to frictional coupling devices of the transmission, only while the transmission is in the process of the shifting operation. Further, the determined point of time at which the shifting operation is completed may be used for lowering the engine torque while the transmission is in a shifting action.

Where the automatic transmission has an underdrive mechanism associated the output shaft and an overdrive mechanism associated with the input shaft, it is proposed to determine the termination of a shifting operation of the transmission, based on a detected rotating speed of a rotary member of the overdrive mechanism. An example of such a technique is disclosed in laid-open Publication No. 48-20348 of examined Japanese Patent Application. As the rotary member for detecting or determining the completion of shifting operations of the transmission, the input shaft (turbine impeller shaft of a torque converter) of the transmission may be most preferably used, since the rotating speed of the input shaft relatively accurately reflects the commencement and termination of each shifting action of the transmission. However, the detection of the rotating speed of the turbine impeller shaft (input shaft) is very difficult because a sensor for detecting the speed of this shaft cannot be easily installed. In view of this inconvenience, there has been conventionally used one of rotary members of the overdrive mechanism, such as a sun gear or a clutch drum, which has a behavior that indicates occurrences of each shifting action of the transmission. This rotary member (e.g., sun gear) has the same rotating speed as the turbine impeller while the transmission is placed in one of a 1st-speed, a 2nd-speed and a 3rd-speed position. In a 4th-speed position of the transmission, the rotary member is at rest. Therefore, the termination or completion of a shifting operation to establish one of the 1st-speed, 2nd-speed and 3rd-speed positions may be determined based on the detected speed of the rotary member of the overdrive mechanism, detected speed of the transmission output shaft, and the known gear ratio of the transmission. Further, the termination of a shifting operation between the 3rd-speed and 4th-speed positions can be determined when the relevant rotary member is stopped.

However, the above conventional method of determining the termination or completion of a shifting operation of the transmission may apply only where the shifting operation requires a shifting action of only one of the underdrive and overdrive mechanisms. In other words, where the shifting operation requires concurrent shifting actions of both of the two mechanisms, the determination of the completion of the shifting operation according to the conventional method is not necessarily accurate and satisfactory.

Described more particularly, when the depressed accelerator pedal is abruptly released, there may arise requirements for successive shifting operations, for example, a shifting action from the 2nd-speed position to the 3rd-speed position, and then a shifting action from the 3rd-speed position to the 4th-speed position. However, the controller for the transmission may be adapted to wait a predetermined time after the determination to effect the first shifting action, so that the controller generates a command to effect a shifting action from the 2nd-speed position to the 4th-speed position. For instance, the controller generates a shifting command for concurrently activating a clutch C2 of the underdrive mechanism for a shift-up action from the 2nd-speed position to the 3rd-speed position, and a brake B0 of the overdrive mechanism for a shift-up action from the 3rd-speed position to the 4th-speed position, as indicated in the table of FIG. 2, whereby the transmission is shifted up from the 2nd-speed position directly to the 4th-speed position.

The frictional coupling devices including the above-indicated clutch C2 and brake B0 are provided with accumulators for assuring smooth engaging actions. Because of a difference in the absorbing load between the two accumulators due to a difference in the gear ratio of the clutch C2 and brake B0, the two accumulators have different capacities. Consequently, the engaging action of the brake B0 is completed before the engaging action of the clutch C2, provided that the shifting operation with the clutch and brake is effected with the same opening angle of the throttle valve of the vehicle engine. Accordingly, the conventional method based on the rotating speed of the sun gear of the overdrive mechanism determines the completion of the shifting operation at the time when the rotation of the sun gear is stopped, that is, when the brake B0 has been fully engaged.

However, the clutch C2 is still in the process of an engaging action when the brake B0 has been brought to its fully engaged position. Namely, the transmission is still in the process of the shifting operation. If this erroneous determination of the completion of the shifting operation is used for accomplishing other control functions associated with the automatic transmission, the transmission may suffer from increased shifting shocks. For example, the activation of the lockup clutch, termination of the feedback pressure control of the relevant accumulator, and restoration of the engine torque may be effected at inadequate points of time.

SUMMARY OF THE INVENTION

It is therefore an object of the present invention to provide an improved apparatus for controlling an automatic transmission of a motor vehicle, which includes a device capable of accurately determining the completion or termination of a shifting operation of the transmission that requires shifting actions of both of an overdrive and an underdrive mechanism of the transmission.

The above object may be attained according to the principle of the present invention, which provides an apparatus for controlling an automatic transmission disposed in a power transmitting system for a motor vehicle, having an input shaft, an output shaft, a first transmission mechanism, a second transmission mechanism connected in series with the first transmission mechanism, and a rotary member associated with the input shaft, the apparatus comprising first testing means, first determining means, second testing means and second determining means. The first testing means is adapted to test for the presence of a first shifting command to effect a first shifting operation of the transmission which requires a shifting action of only one of the first and second transmission mechanisms. If the first testing means test positively for the presence of the first shifting command, the first determining means effects a first determination based on a rotating speed of the rotary member of the second transmission mechanism, that the first shifting operation is completed. The second testing means is adapted to test for the presence of a second shifting command to effect a second shifting operation of the transmission which requires shifting actions of both of the first and second transmission mechanisms. If the second shifting command is tested positively by for the second detecting means, the second determining means first effects a second determination also based on the rotating speed of the rotary member, that the shifting action of the second transmission mechanism is completed, and then effects a third determination that the second shifting operation is completed, at the time when a predetermined time interval has passed after the moment of the second determination.

The shifting action of the first transmission mechanism is completed after the shifting action of the second transmission mechanism is completed. Namely, the second shifting operation requires a shifting action of a frictional coupling device of the first transmission mechanism, whose engagement is completed after the completion of engagement of a frictional coupling device of the second transmission mechanism. The second transmission mechanism is not necessarily an overdrive mechanism of the automatic transmission.

In the apparatus of the present invention constructed as described above, the second testing means operates to determine whether there exists the second shifting command to effect the second shifting operation which requires the shifting actions of the first and second transmission mechanisms, which initially take place concurrently. If the second shifting command is positively tested for the second determining means determines, based on the speed of the rotary member of the second transmission mechanism, that the shifting action of the second transmission mechanism is completed. Only after the predetermined time interval after the determination of the completion of the shifting action of the second transmission mechanism, the second determining means determines that the second shifting operation involving the shifting actions of the two transmission mechanisms is completed. It will be understood that the time interval indicated above is determined so that the shifting action of the first transmission mechanism is completed during the time interval, that is, so that the determination of the completion of the second shifting operation is made only after the shifting action of the first transmission mechanism is completed. Thus, the relevant time interval is determined based on a difference between the required times for completion of the shifting actions of the first and second transmission mechanisms.

As described above, the present apparatus permits accurate determination of the completion or termination of a shifting operation of the transmission which requires shifting actions of frictional coupling devices of both of the first and second transmission mechanisms, which last for different lengths of time. Accordingly, the present apparatus assures adequate determination of various control timings, such as the moment which the lockup clutch is activated, or the moment at which the feedback pressure control of the accumulator for the frictional coupling device is terminated.

The second determining means may comprise time measuring means for measuring a time after the moment of the second determination of the completion of the shifting action of the second transmission mechanism. The second determining means effects the third determination of the completion of the second shifting operation when the time measured by the time measuring means exceeds the predetermined time interval.

In one form of the invention, the first transmission mechanism comprises an underdrive mechanism including two or more planetary gear units capable of selectively establishing two or more shift positions, while the second transmission mechanism comprises an overdrive mechanism which is disposed between the first transmission mechanism and the vehicle engine and which provides an overdrive shift position, for example, 4th-speed position.

In the above form of the invention, the overdrive mechanism may include a hydraulically operated brake while the underdrive mechanism may include a hydraulically operated first clutch which initially operates concurrently with the brake to effect the second shifting operation. In this case, the first clutch may be provided with an accumulator which is controlled based on a change in the rotating speed of a drum of a hydraulically operated second clutch incorporated in the overdrive mechanism as the rotary member. In this case, the apparatus may further comprise pressure control means for controlling the back pressure of the accumulator until the second determining means effects the third determination that the second shifting operation of the transmission is completed. The pressure control means may comprise a speed sensor for detecting the rotating speed of the drum of the second clutch, and calculating means for calculating a target speed based on the speeds of the drum upon commencement and termination of the second shifting operation. The pressure control means controls the back pressure of the accumulator so that the rotating speed of the drum detected by the speed sensor coincides with the target speed calculated by the calculating means.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIG. 2 is a view illustrating different operating conditions of frictional coupling devices of the automatic transmission;

FIGS. 6A and 6B are block diagrams of the transmission control.

DETAILED DESCRIPTION OF THE PREFERRED EMBODIMENT

Figure 1:
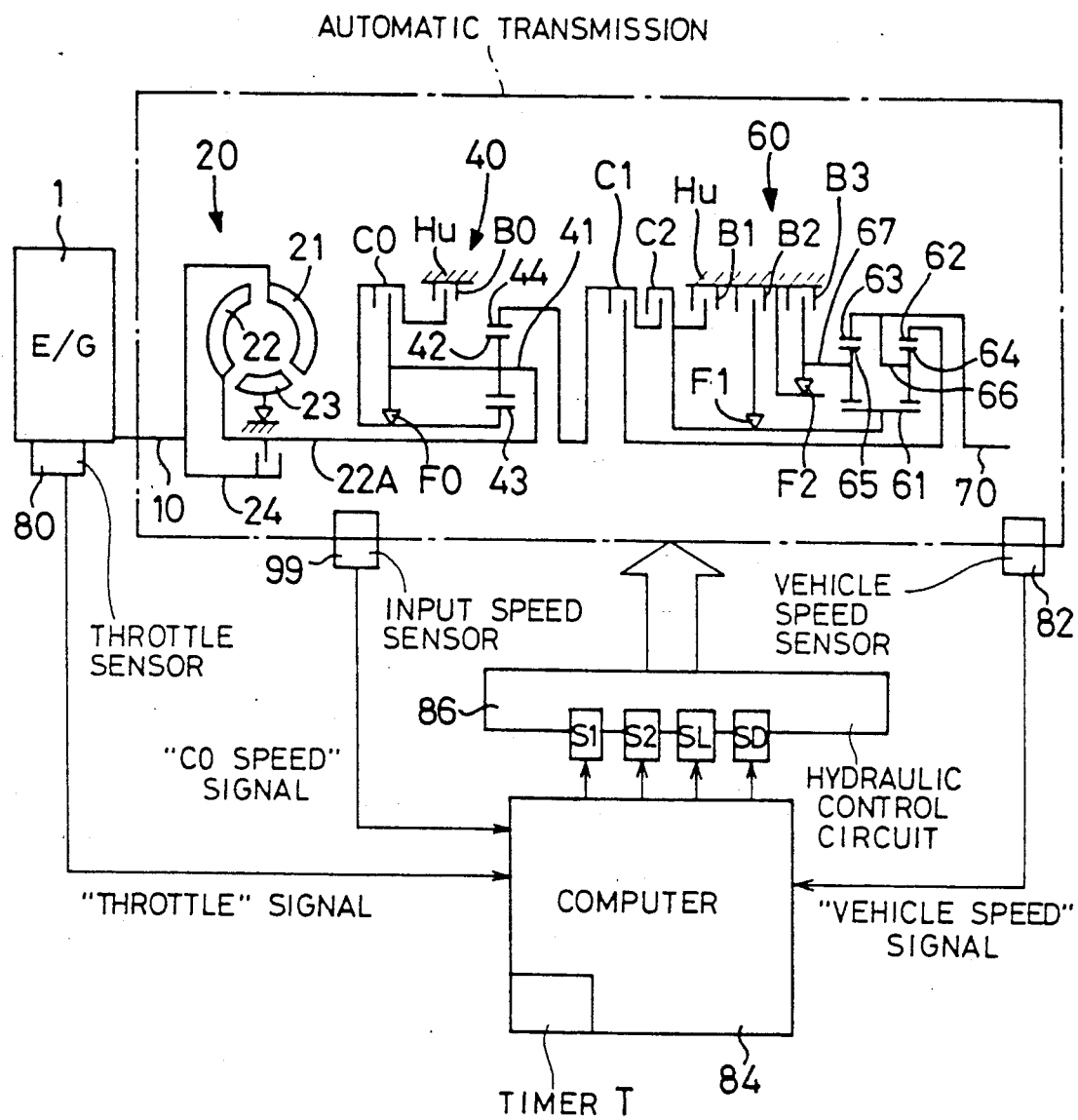
FIG. 1 is a schematic block diagram showing an example of an automatic transmission for a motor vehicle, and one embodiment of a hydraulic control apparatus of the invention for controlling the automatic transmission.

Referring to the schematic view of FIG. 1, there is shown a power transmitting system of a motor vehicle, which includes a hydraulic control apparatus constructed according to a presently preferred embodiment of this invention for controlling the automatic transmission of the system.

The automatic transmission indicated by a block of one-dot-chain line in FIG. 1 includes a torque converter 20 connected to a vehicle engine 1 through a crankshaft 10, a first transmission mechanism in the form of an overdrive mechanism 40 connected in series to the torque converter 20, and a second transmission mechanism in the form of an underdrive mechanism 60 connected in series to the overdrive mechanism 40. The underdrive mechanism 60 has one rear-drive position "R", and three forward-drive positions "1" (1st-speed position), "2" (2nd-speed position), and "3" (3rd-speed position). The three forward-drive positions "1", "2" and "3" are selectively established while a driver-controlled shift lever is placed in one of three positions "L", "2" and "D", with the overdrive mechanism 40 placed in its off position, as indicated in the table of FIG. 2. While the overdrive mechanism 40 is placed in its on position, a fourth forward-drive position "4" (4th-speed position) may be established as needed, when the driver-controlled shift lever is in the DRIVE position "D".

The torque converter 20 is a well known arrangement which has a pump impeller 21, a turbine impeller 22, a stator 23 and a lockup clutch 24.

The overdrive mechanism 40 as the first transmission mechanism employs a single planetary gear unit consisting of a sun gear 43, a ring gear 44, a planetary pinion 42, and a carrier 41. This planetary gear unit is controlled by frictional coupling devices which consist of a clutch C0, a brake B0, and a one-way clutch F0. 10 The underdrive mechanism 60 as the second transmission mechanism incorporates two planetary gear units which use a common sun gear 61. The first planetary gear unit includes the sun gear 61, a ring gear 62, a planetary pinion 64 and a carrier 66, while the second planetary gear unit includes the sun gear 61, a ring gear 63, a planetary pinion 65 and a carrier 67. The operating condition of these two planetary gear units, and the connection with the overdrive mechanism 40 are regulated by frictional coupling devices which consist of clutches C1, C2, brakes B1-B3 and one-way clutches F1, F2.

With the clutches C1, C2 and brakes B1-B3 of the underdrive mechanism 60 controlled as indicated in FIG. 2, one of the forward-drive positions "1", "2" and "3" is selected. With the clutch C0 and brake B0 of the overdrive mechanism 40 controlled as indicated in FIG. 2, the automatic transmission is shifted between the forward-drive positions "3" and "4".

Since the automatic transmission schematically illustrated in FIG. 1 and described above is well known in the art, no further description of the same is deemed necessary for understanding the principle of the present invention, which relates to the apparatus for controlling the transmission.

The hydraulic control apparatus for controlling the automatic transmission utilizes a hydraulic control circuit 86, and a hydraulic control device in the form of a computer 84. The computer 84 receives a THROTTLE signal from a throttle sensor 80, a VEHICLE SPEED signal from a vehicle speed sensor 82, and a C0 SPEED signal from an input speed sensor 99. The THROTTLE signal represents an angle of opening of a throttle valve of the engine 10, which is considered to be a currently required output (torque) of the engine 1. The VEHICLE SPEED signal represents a rotating speed n0 of an output shaft 70 of the automatic transmission, from which a running speed of the vehicle can be calculated. The C0 SPEED signal represents a rotating speed Nc0 of the drum of the clutch C0 (speed of the sun gear 43 of the overdrive mechanism 40), which indicates a shifting condition of the overdrive mechanism 40, more specifically, the termination of an engaging action of the brake B0, as described below.

The hydraulic control circuit 86 includes solenoid-operated shift valves S1 and S2 for operating the brakes and clutches of the automatic transmission according to transmissoin shift maps stored in the computer 84, based on the currently detected opening angle of the throttle valve and vehicle running speed, so as to shift the automatic transmission, as indicated in the table of FIG. 2. The hydraulic control circuit 86 further includes a solenoid-operated valve SL for operating the lockup clutch 24, and a linear solenoid valve SD which will be described.

In the present hydraulic control apparatus including the above-indicated computer 84 and hydraulic control circuit 86, the hydraulic pressure supplied to each frictional coupling device (C0-C2, B0-B3) is controlled in a feedback fashion such that the detected speed Nc0 of the drum of the clutch C0 coincides with a calculated target speed Nc01, so as to minimize a shifting shock of the transmission. This feedback control of the hydraulic pressure is effected until a shifting or engaging action of each frictional coupling device is completed or terminated. To this end, it is necessary to accurately determine or detect the point of time at which the shifting action of the frictional coupling device is terminated.

The manner in which the hydraulic pressure supplied to the frictional coupling device is regulated is well known, as disclosed in laid-open Publication No. 58-133641 of unexamined Japanese Utility Model Application, for example. Briefly, the arrangement for regulating the fluid pressure applied to the brake B2 will be described by way of example, by reference to FIG. 3.

Figure 3:
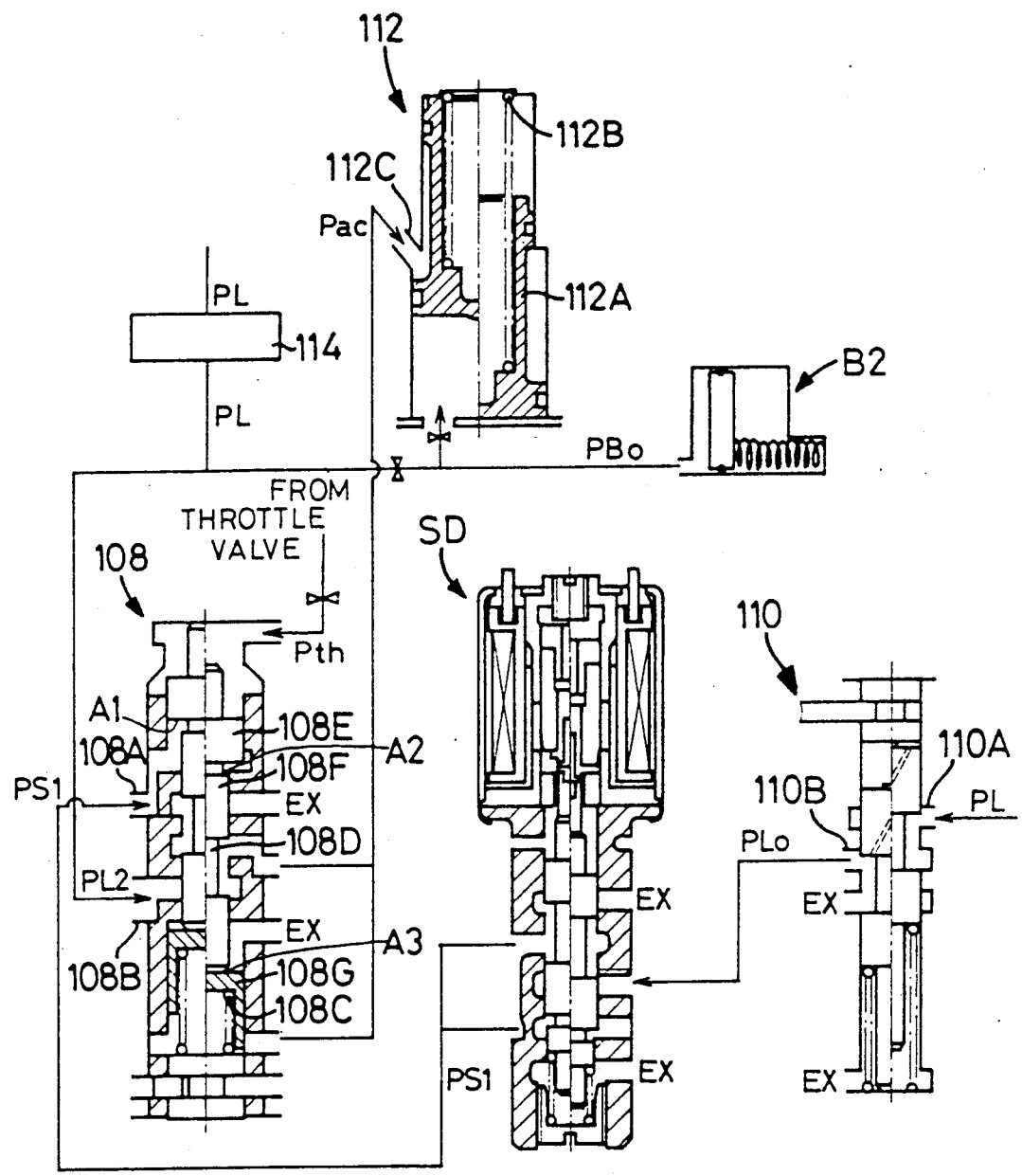
FIG. 3 is a fragmentary view of a hydraulic control circuit including an accumulator control value for controlling a fluid supply to one of the frictional coupling devices.

In FIG. 3, reference characters SD denote the linear solenoid valve connected between an accumulator control valve 108 and a modulator valve 110. The accumulator valve 108 is connected to an accumulator 112, the brake B2, and a shift valve 114 which is one of the valves controlled by means of the solenoid-operated valves S1 and S2. As indicated in FIG. 2, the brake B2 is engaged when the transmission is shifted up from the 1st-speed position "1" to the 2nd-speed position "2".

The hydraulic system has a hydraulic pump (not shown) which produces a line pressure PL. The modulator valve 110 receives at its port 110A the line pressure PL, and produces a modulated pressure PL0 at its port 110B.

The modulated pressure PL0 of the modulator valve 110 is applied to the linear solenoid valve SD, which produces a controlled pressure PS1 corresponding to a difference between the currently detected speed Nc0 of the drum of the clutch C0 and the predetermined target speed Nc01, as known in the art. More specifically, the computer 84 which receives the currently detected speed Nc0 compares the speed Nc0 with the target speed Nc01. The target speed Nc01 of the clutch C0 drum is determined based on the speed Nc0 at the time of commencement of a shifting action of the transmission with an engaging action of the brake B2, and the speed Nc0 at the time of termination or completion of the shifting action (i.e., vehicle speed n0 × gear ratio $i_H$ of the transmission after the shifting action). When the transmission is shifted up from the 1st-speed position "1" to the 2nd-speed position "2", for example, the speed Nc0 of the clutch C0 is lowered. If the speed Nc0 becomes lower than the target speed Nc01, this indicates that the shifting action proceeds too fast, or the rate of lowering of the speed Nc0 is excessively higher than that of the target speed Nc01. Therefore, the fluid pressure applied to the brake B2 should be lowered. To this end, the computer 84 applies to the linear solenoid valve SD an electric current pulse having a duty cycle corresponding to the difference (Nc0–Nc01), whereby the valve SD an electric current pressure PS1 which corresponds to the duty cycle.

The thus controlled pressure PS1 is applied to a port 108A of the accumulator control valve 108. The valve 108 also receives a throttle pressure Pth indicative of the throttle opening of the throttle valve which reflects the engine torque. Based on these input signals, i.e., controlled pressure PS1 and throttle pressure Pth, the accumulator control valve 110 regulates a line pressure PL2 at its port 108B, into an accumulator back pressure Pac applied to a back pressure chamber 112C of the accumulator 112. Described more particularly, the accumulator control valve 108 has a valve spool 108D which includes a first land 108E having a pressure-receiving area A1, and a second land 108F having a pressure-receiving area A2. The valve spool 108D is biased by a biasing force W of a spring 108C, via a plunger 108G which has a pressure-receiving area A3. The spool 108D is positioned so as to satisfy the following equation (1):

$$A3 \cdot Pac + W + (A1 - A2)PS1 = A1 \cdot Pth \qquad (1)$$

As a result, the back pressure Pac of the accumulator 112 is controlled based on the throttle pressure Pth, controlled pressure PS1 and biasing force W of the spring 108C, according to the following equation (2):

$$Pac = \{A1 \cdot Pth - (A1 - A2)PS1 - W\}/A3 \qquad (2)$$

When the computer 84 effects determination that the automatic transmission should be shifted up to the 4th-speed position, the shift valve 114 is activated through the solenoid-operated valve S1, to start applying the line pressure PL (PB0) to the brake B2. Consequently, a piston 112A of the accumulator 112 begins to be moved upward against a biasing action of a spring 112B. While the piston 112A is moved upward, the pressure PB0 in the brake B2 is maintained at a level which corresponds to a sum of the biasing force of the spring 112B and the force produced by the back pressure Pac applied to the back pressure chamber 112C. Therefore, by controlling the accumulator back pressure Pac by means of the modulator valve 110, linear solenoid valve SD and accumulator control valve 108, the transient fluid pressure PB0 applied to the brake B2 during its engaging action for establishing the 4th-speed position of the transmission can be suitably controlled.

Since the linear solenoid valve SD is operated depending upon the difference between the currently detected speed Nc0 of the drum of the clutch C0 and the target speed NC01, the pressure PB0 applied to the brake B2 is controlled in a feedback manner so that the speed Nc0 of the clutch C0 drum is lowered following the lowering of the target speed Nc01.

Figure 4:
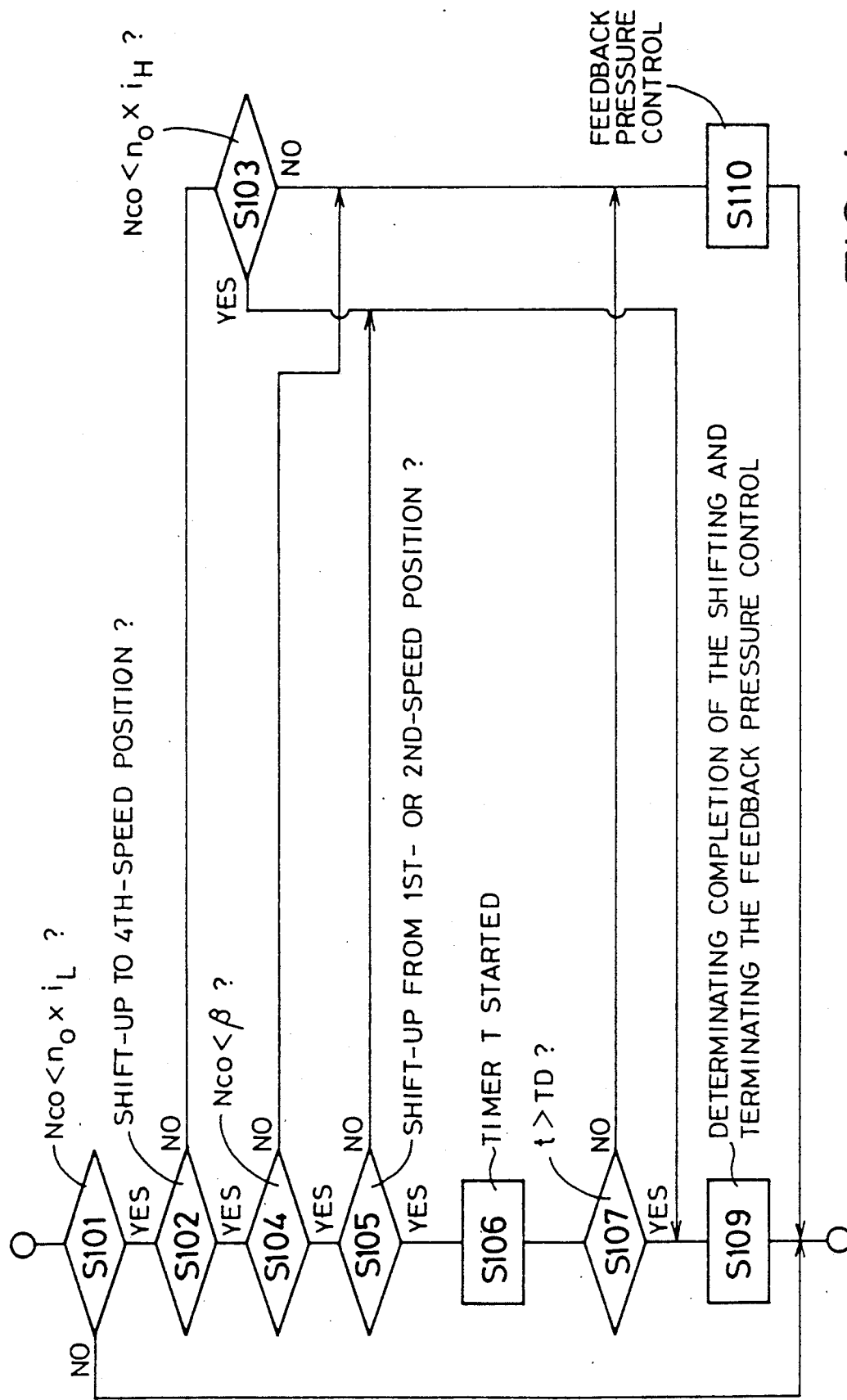
FIG. 4 is a flow chart illustrating an operation of the control apparatus.

Referring next to FIGS. 4, 6A and 6B there will be described a control routine for starting and terminating the feedback pressure control for the frictional coupling devices of the automatic transmission when the automatic transmission is shifted up to the 4th-speed position "4".

According to the invention, the computer 84 includes means 202 for producing a first shifting command to affect a first shifting operation of the automatic transmission which requires a shifting action of only one of the first and second transmission mechanisms, e.g. the overdrive mechanism. The computer 84 further includes first testing means 204 for testing for the presence of the first shifting command, as well as first determining means 206, operable when the first testing means positively test for the presence of the first shifting command, for effecting a first determination based on a rotary speed of a rotary member associated with the input shaft (the crank shaft 10), e.g., via the input speed sensor 99. The computer also includes means 208 for producing a second shifting command to effect a second shifting operation of the automatic transmission which requires shifting actions of both the first and second transmission mechanisms, e.g., both the overdrive and under drive mechanisms. It also includes the second testing means 210 for testing the presence of the second shifting command, as well as second determining means 212, operable when the second testing means positively test for the presence of the second shifting command. The second determining means effects a second determination based on the rotating speed of the rotary member that the shifting of the second transmission mechanism is completed, and a third determination that the second shifting operation is completed at a predetermined time interval after the second determination.

Initially, step S101 determined whether the currently detected speed Nc0 is lower than n0 × $i_L$, or not, where n0 is the speed of the output shaft 70 of the transmission, while $i_L$ is the gear ratio of the transmission prior to a shifting action of the transmission.

The lowering of the speed Nc0 below the speed n0 × $i_L$ indicates the commencement of a shift-up action of the transmission. If an affirmative decision (Y) is obtained in step S101, the control flow goes to step S102 in which the computer 84 determines whether there exists a shifting command to shift up the transmission to the 4th-speed position "4", or not. It is noted that the shift-up operation to the 4th-speed position "4" requires at least an engaging action of the brake B0 of the overdrive mechanism 40. If a negative decision (N) is obtained in step S102, this means that the overdrive mechanism 40 is not operated. In this case, the control flow goes to step S110 through step S103, to effect the feedback pressure control for the appropriate frictional coupling device, while the speed Nc0 is not lower than $n0 \times i_H$ (gear ratio after the shifting operation). Namely, the feedback pressure control is effected until the speed Nc0 becomes below $n0 \times i_H$, or until an affirmative decision (Y) is obtained in step S103 and step S109 is effected.

It will be understood from the above description that where a shifting operation of the transmission does not require an engaging action of the brake B0 of the overdrive mechanism 40, the computer 84 detects or determines the completion of the shifting operation at the time when the speed Nc0 of the drum of the clutch C0 becomes lower than the synchronizing speed ($n0 \times i_H$) In view of a possible error in the detection of the speed Nc0, a value ($no \times i_H + \alpha$) may be substituted for the value ($n0 \times i_H$) used in step S103.

If an affirmative decision (Y) is obtained in step S102, that is, if the transmission has been commanded to be shifted up to the 4th-speed position "4", step S102 is followed by step S104 in which the computer 84 determines whether the speed Nc0 is lower than a predetermined speed close to zero. The speed Nc0 is zeroed when the brake B0 of the overdrive mechanism 40 has been fully engaged, i.e., when the engagement of the brake B0 is completed. Therefore, step S104 is effected to determine whether the engaging action of the brake B0 is completed. In view of a possible detection error of the speed Nc0, the value $\beta$ is used in place of the value "0".

If the brake B0 has not been fully engaged yet, i.e., if a negative decision (N) is obtained in step S104, the control flow goes to step S110 to effect the feedback pressure control. If the brake B0 has been fully engaged, or an affirmative decision (Y) is obtained in step S104, the control flow goes to step S105 to determine whether the transmission has been commanded to be shifted up from the 1st- or 2nd-speed position "1" or "2" to the 4th-speed position "4", or not. As indicated in FIG. 2, a shift-up action of the transmission to the 4th-speed position "4" from the 1st-speed position "1" or 2nd-speed position "2" requires engaging actions of not only the brake B0 of the overdrive mechanism 40 but also the clutch C2 of the underdrive mechanism 60. On the other hand, a shift-up action to the 4th-speed position from the 3rd-speed position "3" requires only the brake B0 to be engaged. If the transmission has been commanded to be shifted from the 3rd-speed position "3", that is, if a negative decision (N) is obtained in step S105 (first testing means), the computer 84 determines that the shifting of the transmission from the 3rd-speed position to the 4th-speed position is completed (first determining means), and the control flow goes to step S109 in which the feedback pressure control for the brake B0 is terminated.

If the transmission has been commanded to be shifted from the 1st-speed or 2nd-speed position to the 4th-speed position, namely, if an affirmative decision (Y) is obtained in step S105 (second testing means), the control flow goes to step S106 to start a timer T incorporated in the computer 84. In other words, a time interval t from the point of time at which the brake B0 has been fully engaged (moment at which the affirmative decision is obtained in step S104) is measured by the timer T. At the time the timer T is started, the clutch C2 of the underdrive mechanism 60 has not been fully engaged yet, and the shift-up action to the 4th-speed position is not completed, namely, the shifting operation of the transmission to the 4th-speed position is not completed.

Step S106 is then followed by step S107 to determine whether the time interval t exceeds a predetermined time $T_D$. If a negative decision (N) is obtained in step S107, step S110 is executed to continue the feedback pressure control for the clutch C2. If the time interval t measured by the timer T exceeds the predetermined time $T_D$, the computer 84 determines that the engaging action of the clutch C2 is completed, and the control flow goes to step S109 to terminate the feedback pressure control for the clutch C2. That is, the computer 84 effects a determination (by second determining means) that the shift-up operation of the transmission from the 1st-speed or 2nd-speed position to the 4th-speed position is completed.

Figure 5:
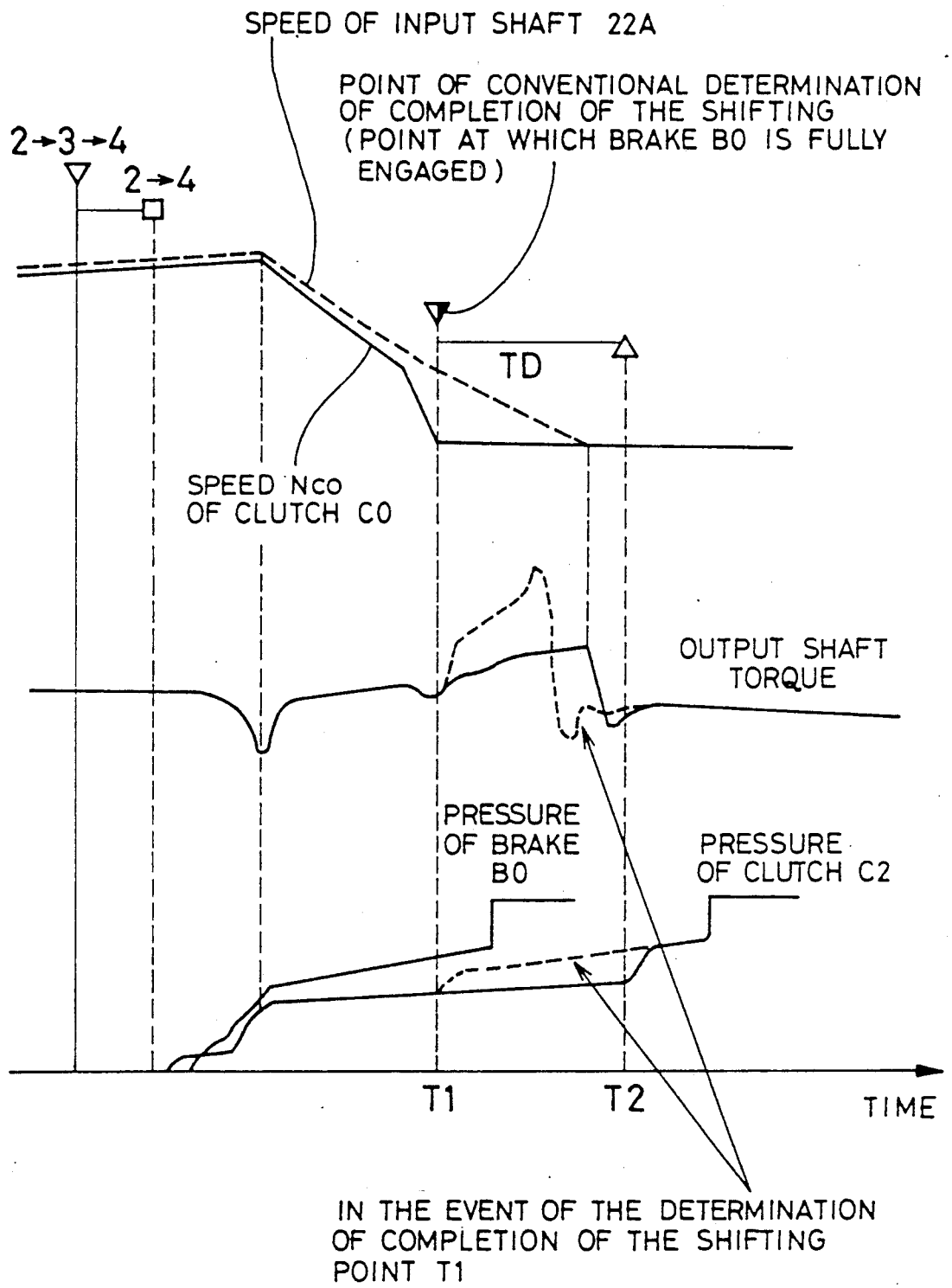
FIG. 5 is a graph showing changes in various parameters of the automatic transmission during a shift-up operation.

The graph of FIG. 5 shows variations in various parameters associated with a shift-up operation of the transmission from the 1st-speed or 2nd-speed position to the 4th-speed position, which involves the engagement of the clutch C2 of the underdrive mechanism 60, as well as the engagement of the brake B0 of the overdrive mechanism 40. The computer 84 determines (in step S104) at a point of time T1, that the engagement of the brake B0 of the overdrive mechanism 40 is completed. Conventionally, the determination of the completion of the shift-up action to the 4th-speed position is effected at this point of time T1, even if the clutch C2 of the underdrive mechanism 60 has not been fully engaged at that time. According to the present embodiment, however, the computer 84 does not effect the determination of the completion of the shift-up operation at the point T1, because the clutch C2 is still in the partially engaged state or has not been fully engaged yet. Namely, the determination of the completion of the shift-up operation including the engagement of the clutch C2 is effected at a point of time T2 which is the predetermined time interval TD after the point of time T1. According to the conventional determination at T1 of the completion of the shifting operation from the 1st-speed or 2nd-speed position to the 4th-speed operation, the torque of the output shaft 70 of the transmission and the pressure of the clutch C2 will undesirably change, as indicated by dashed lines in FIG. 5. According to the present embodiment, the output shaft torque and the pressure of the clutch C2 change comparatively smoothly as indicated by solid lines, assuring relatively smooth operation of the transmission when the transmission is shifted up from the 1st-speed or 2nd-speed position to the 4th-speed position, with the brake B0 and the clutch C2 brought from the non-engaged position to the engaged position.

Although the illustrated embodiment described above is adapted such that the feedback control of the fluid pressure to the frictional coupling devices is terminated upon determination of completion of a shifting action of the transmission, a signal representative of the determination may be used for many other purposes associated with the automatic transmission.

While the present invention has been described in its presently preferred embodiment with a certain degree of particularity, it is to be understood that the invention is not limited to the details of the illustrated embodiment, but may be embodied with various changes, alterations, modifications and improvements, which may occur to those skilled in the art, without departing from the spirit and scope of the invention defined in the appended claims.

What is claimed:

1. An apparatus including an automatic transmission disposed in a power transmitting system for a motor vehicle, having an input shaft, an output shaft, a first transmission mechanism, a second transmission mechanism, and a rotary member associated with the input shaft, and means for controlling the automatic transmission, said controlling means comprising:

means for producing first and second shifting commands;

first testing means for testing for the presence of a first shifting command to effect a first shifting operation of said automatic transmission which requires a shifting action of only one of said first and second transmission mechanisms;

first determining means, operable when said first testing means positively tests for the presence of said first shifting command, for effecting a first determination based on a rotating speed of said rotary member, that said first shifting operation is complete;

second testing means for testing the presence of a second shifting command to effect a second shifting operation of said automatic transmission which requires shifting actions of both of said first and second transmission mechanisms; and second determining means, operable when said second testing means positively tests for the presence of said second shifting command, for effecting a second determination based on said rotating speed of said rotary member that the shifting action of said second transmission mechanism is completed, and a third determination that said second shifting operation is completed at a predetermined time interval after said second determination.

2. An apparatus according to claim 1, wherein said second determining means comprises time measuring means for measuring a time after said second determination of the completion of the shifting action of said second transmission mechanism, said second determining means effecting said third determination when the time measured by said time measuring means exceeds said predetermined time interval.

3. An apparatus according to claim 1, wherein said first transmission mechanism comprises an underdrive mechanism including a plurality of planetary gear units capable of selectively establishing a plurality of shift positions, while said second transmission mechanism comprises an overdrive mechanism which is disposed in a portion of said power transmitting system between said first transmission mechanism and an engine of the vehicle.

4. An apparatus according to claim 3, wherein said rotary member consists of a drum of a clutch incorporated in said overdrive mechanism.

5. An apparatus according to claim 3, wherein said overdrive mechanism includes a hydraulically operated brake while said underdrive mechanism includes a hydraulically operated first clutch which initially operates concurrently with said brake to effect said second shifting operation, said first clutch being provided with an accumulator so that a fluid pressure applied to said first clutch is raised under the control of a back pressure of said accumulator which is controlled based on a change in a rotating speed of a drum of a hydraulically operated second clutch incorporated in said overdrive mechanism as said rotary member.

6. An apparatus according to claim 5, further comprising pressure control means for controlling said back pressure of said accumulator until said second determining means effects said third determination that said second shifting operation of the automatic transmission is completed.

7. An apparatus according to claim 6, wherein said pressure control means comprises a speed sensor for detecting the rotating speed of said drum of said second clutch, and calculating means for calculating a target speed based on speeds of said drum upon commencement and termination of said second shifting operation, said pressure control means controlling said back pressure of said accumulator so that said rotating speed detected by said speed sensor coincides with said target speed calculated by said calculating means.

* * * * *

UNITED STATES PATENT AND TRADEMARK OFFICE
CERTIFICATE OF CORRECTION

PATENT NO. : 5,047,935

DATED : September 10, 1991

INVENTOR(S) : Yuji Kashihara

It is certified that error appears in the above-identified patent and that said Letters Patent is hereby corrected as shown below:

On the title page, item [73] Assignee:
   The assignee is incorrect, should be, --Toyota Jidosha Kabushiki Kaisha, Toyota, JAPAN--.

Signed and Sealed this

Thirteenth Day of April, 1993

*Attest:*

STEPHEN G. KUNIN

*Attesting Officer*     *Acting Commissioner of Patents and Trademarks*